July 6, 1948.                J. D. WORLEY                    2,444,904
                BONDED RUBBER JOINT FOR COUPLINGS AND THE
                   LIKE AND METHOD OF MAKING THE SAME
                          Filed Dec. 4, 1943

Inventor
James D. Worley
By N. C. Lord
Attorney

Patented July 6, 1948

2,444,904

UNITED STATES PATENT OFFICE 2,444,904

BONDED RUBBER JOINT FOR COUPLINGS AND THE LIKE AND METHOD OF MAKING THE SAME

James D. Worley, Burbank, Calif., assignor to Lord Manufacturing Company, Erie, Pa., a corporation of Pennsylvania Application December 4, 1943, Serial No. 512,944

9 Claims. (Cl. 64—13)

In the production of certain types of bonded elastic joints, especially where circumstances affecting the construction impose certain limitations in the thickness of the parts and the consequent mass of the elastic medium used, it is desirous to obtain the maximum freedom of movement between the parts so united and I have found that it is essental that the initial stress imparted to the rubber, or whatever synthetic compound is substituted, as a result of shrinkage due to cooling after the curing or vulcanizing, be relieved so that a maximum freedom of movement between the parts exists in the finished article.

One object of my invention is the provision of a method of molding for use in the manufacture of parts to which an elastic compound is bonded, as by vulcanization, in which a mold part controls, or defines, the area of the bonded surface during the molding operation, and while it remains an integral part of the finished structure yet is capable of subsequent deformation to an extent where it does not interfere with the intended performance of the parts.

Another object of my invention is the provision of a method of joining two proximate surfaces by an interposed rubber filler bonded to each comprising means for relieving the rubber of initial tension or strain so that in operation movement of one part may be imparted to the other through a softer cushion than would otherwise be the case.

A further object of my invention is to provide a coupling, or other mechanical structure, having parts connected by a bonding of rubber and including a seal, for restricting the flow of rubber in the molding operation to which the rubber does not become bonded, said seal being sufficiently rigid during the molding operation to close the joint between the parts, and yet is compressible under a force applied to the parts which when relieved will allow movement to said parts in all directions. This collapsing of the parts also compresses the rubber and the relief of the force thus exerted allows the rubber to assume a normal or passive state, it in turn forcing a separation of the parts into their normal operative position.

To these and other ends my invention consists in further improvements and arrangement of parts all as will be further described in the accompanying specification and particularly set forth in the appended claims.

In the drawings.

Similar reference characters in the several figures designate similar parts.

Figure 2:
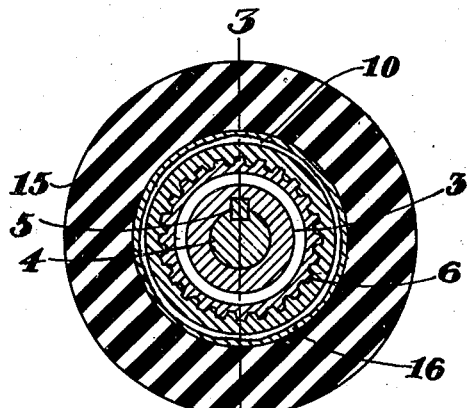
Figure 2 is a transverse sectional view thereof.

For the purpose of illustrating one embodiment of my invention I have shown a form of coupling which was developed for use in connection with an airplane motor for driving an auxiliary part such as a generator. In this association of parts a certain flexibility in the driving connections is desirable, as well as means for reducing as far as possible the transmission of vibration from one moving element to another, at the same time keeping the overall size of the device within reasonable limits. The coupling comprises members 1 and 2, one of which is a driving member, the other the driven member. The part 1 has the hub 3 adapted to be rigidly connected to a shaft 4, as by a key 5. The other part 2 also has a hub portion 6, surrounding the hub 3, the interior of which is dentured to receive the correspondingly shaped tubular end of a second shaft 7.

The proximate surfaces of the parts 1 and 2 are faced off at slightly divergent angles, as indicated by 8 and 9, and the latter terminates at the annular surface 10 on the outside of the hub 6. The inner end of the surface 8 is a flat face 11 opposite the outer end of the hub 6, outside the periphery of the dentures. Opposite the latter is a recess 12 to accommodate a slight intrusion of the end of shaft 7 should exigencies in the assembly of the parts cause the latter to project beyond the inner end of the hub 6.

The wedge shaped annular recess between the surfaces 8 and 9 is filled with an elastic compound 15, such as rubber, or a synthetic thereof, which is united to said surfaces by a suitable bonding process embodying vulcanization.

Figure 4:
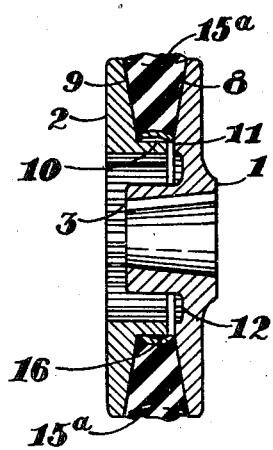
Figure 4 is a view similar to Figure 3 showing the initial assembly of the parts as well as their position upon the completion of the molding operation.
Figure 1:
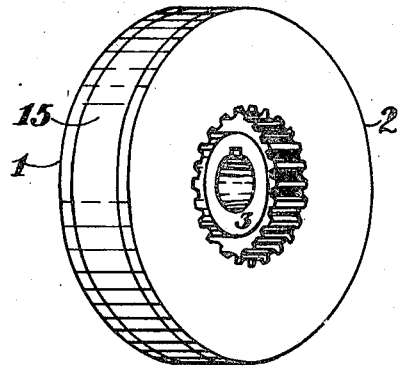
Figure 1 is a perspective view of a coupling illustrating one embodiment of my invention.

In performing the last mentioned operation there are two essentials to be observed, one the prevention of the rubber in the semi-plastic condition and under molding pressure from flowing into the space between the hubs 3 and 6, the other to provide a sufficient area between the faces 8 and 9 to accommodate the requisite mass of elastic compound which when it shrinks in the vulcanizing process will still be of the requisite volume to accommodate the requisite flexibility according to the specifications to be met in the given design the assembly is intended for use. These dual requirements I accomplish by means of a mold part or spacer 16. When the parts are circular, as in the present illustrations, the spacer is made in the form of a ring slightly larger in diameter than the hub 6 and of a width greater than the length of the surface 10 of said hub so that when the face plates 1 and 2 are assembled with the ring between them a space of appreciable width will be assured between the end of the hub 6 and the opposing face 11 on the part 1, as shown in Figure 4. The thickness of the ring 16 will be governed by circumstances. It will only be great enough in any case to give the ring sufficient transverse stability to withstand the initial pressure applied to the parts 1 and 2 in the molding operation to prevent the flow of the elastic composition around its edges. I have found in practice that satisfactory results can be obtained if the outer periphery of the ring is rounded slightly and the ring be made of a soft metal such as aluminum, or other composition, which may be crushed upon the application of a higher pressure. The medium of which the mold part or ring is composed should also be such that no bonding occurs between it and the rubber in contact therewith.

The parts thus described are assembled as shown in Figure 4, the elastic composition 15 being then in the form of an un-cured washer, and inserted in a suitable mold for vulcanizing under pressure and heat, any excess of the compound 15 finding escape through the meeting edges of the parts of the mold, or orifices provided in the mold for this purpose.

Figure 3:
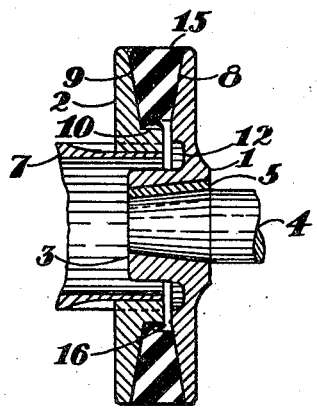
Figure 3 is a cross sectional view taken on the line 3—3 of Figure 2.
Figure 5:
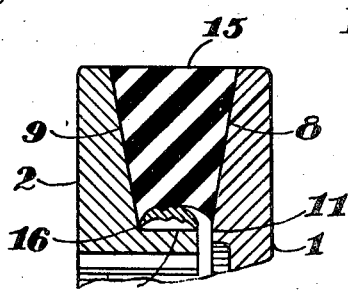
Figure 5 is an enlarged fragmentary view of Figures 3 and 4 showing the sealing ring crimped under the final compression stroke which may be imparted in the molding press or otherwise.

The curing of the rubber causes it to shrink somewhat, as indicated by the dotted lines 15a (see Figure 4) which by reason of the bonding to the faces 8 and 9 sets up an initial tension which acts continuously to draw the parts 1 and 2 together and maintain a metal to metal contact between them and the edges of the ring 16. Now, in order to relieve this tension and destroy this contact I subject the parts 1 and 2 to sufficient pressure to crush the ring 16. This pressure will force the surface 11 into engagement with the end of the hub 6 but when it is relieved the rubber will assume a position of rest, as shown in Figures 3 and 5, its resiliency forcing the parts 1 and 2 away from each other sufficiently to provide for considerable angular difference between the centers of rotation of the shafts 4 and 7.

It will be seen from the foregoing that the mold part 16 initially serves to define the area of the bond. By keeping the rubber out of contact with the surface 10 and since it has non-bonding characteristics, the union of the rubber to metal is confined to the surfaces 8 and 9. When the parts are removed from the curing mold they carry with them the ring 16 which is then functionless and is rendered fully inert as a result of the pressure applied to crimp it. This final action relieves the initial stress due to shrinkage of the rubber so that the normal stresses therein are kept as low as possible, which it will be understood, increases the life of the coupling. In the coupling shown and described the faces 8 and 9 are conical and when their apices coincide on the axis of rotation the stress in the rubber is constant throughout. Hence in order to assure this position of the parts it is important that the latter be maintained separated an exact distance which is obtained by designing the width of the ring 16 with reference to the angular inclination of the faces 8 and 9, so that when the tension has been removed and the parts of the coupling have assumed a passive state the apices of the cones formed by the two bonded surfaces will coincide with the axis of the coupling. In this position a proper stress distribution will be assured which will be evenly distributed throughout the bonded surfaces.

I claim as my invention:

1. In a coupling, the combination with two face plates and an elastic medium bonded to their contiguous surfaces, of a ring located between the plates in contact with the elastic medium and so placed as to define a periphery of the bonding surfaces and also serving as a means of spacing the plates apart, said ring being composed of a non-bonding substance capable of being compressed to take a permanent set upon the application of a force applied to move the plates toward each other.

2. In a coupling, the combination with two face plates and an elastic medium bonded to the contiguous surfaces of the plates, of a concentrically located spacer holding the plates a fixed distance apart and defining the inner periphery of the bonded medium composed of a non-bonding material compressible to take a permanent set and relieve contact between it and said plates upon expansion of the elastic medium following the application of a pressure to the plates sufficient to move them toward each other.

3. In a coupling the combination with two face plates having their proximate faces beveled outwardly, one of said plates having a hub projecting across most of the space between said faces, and an elastic medium bonded to the two latter, of a spacer ring loosely surrounding the hub having a width greater than the length of the hub and serving to determine the inner periphery of the elastic medium, said ring being of a non-bonding material and crushable transversely to take a permanent set upon the application of pressure to the face plates to move them toward each other.

4. The method of making a bonded elastic joint between two joint members arranged with opposing faces consisting in spacing said members apart with a non-removable member engaging and bridging the space between said faces, interposing between the latter an elastic medium, effecting a bonding thereof to said faces and thereafter forming a gap in the spacing member to permit relative movement of the joint members.

5. The method of making an elastic joint having two members with opposing surfaces which comprises assembling the members in a mold with a crushable spacer holding the members apart, molding rubber between and bonding the rubber to said surfaces, and crushing the spacer by pressing the members together.

6. The method of making an elastic joint having two members with opposing surfaces and with interfitting parts adjacent one edge of the surfaces which comprises assembling the members in a mold with a crushable spacer holding the members apart and blocking the flow of material to said parts, molding rubber between and bonding the rubber to said surfaces, and crushing the spacer by pressing the members together.

7. The method of making a flexible coupling having two opposed surfaces with rubber bonded between and to the surfaces which comprises assembling the face plates in a mold with a crushable ring of non-bonding substance between and engaging the surfaces to define the periphery of the bond, molding rubber between and bonding the rubber to the surfaces, and pressing the plates together to crush the ring.

8. In a coupling, two face plates with opposed surfaces and interfitting parts at the inner periphery of the surfaces, a rubber member molded between and bonded to said surfaces, and a spacer ring surrounding the interfitting parts and engaging the surfaces and the rubber to block the flow of rubber to said parts, said spacer being crushable by pressing the plates together so it no longer holds the plates apart.

9. In a coupling, two face plates with opposed surfaces and interfitting parts at the inner periphery of the surfaces, a rubber member molded between and bonded to said surfaces, and a spacing ring surrounding the interfitting parts and in contact with the rubber to block the flow of rubber to said parts during molding, the spacing ring being capable of being rendered ineffective to hold the plates apart.

JAMES D. WORLEY.

REFERENCES CITED

The following references are of record in the file of this patent:

UNITED STATES PATENTS

| Number | Name | Date |
|---|---|---|
| 1,652,651 | Weiland | Dec. 13, 1927 |
| 1,790,516 | Williams | Jan. 27, 1931 |
| 1,958,141 | Haushalter | May 8, 1934 |
| 2,051,442 | Geyer | Aug. 18, 1936 |
| 2,215,523 | Haushalter | Sept. 24, 1940 |
| 2,234,443 | Macbeth | Mar. 11, 1941 |
| 2,250,448 | Edwards | July 29, 1941 |

FOREIGN PATENTS

| Number | Country | Date |
|---|---|---|
| 455,275 | Great Britain | Oct. 12, 1936 |
| 545,079 | Great Britain | 1942 |
| 546,128 | Great Britain | June 29, 1942 |
| 691,589 | Germany | May 31, 1940 |